May 4, 1954 D. E. WILLIS 2,677,440
LUBRICATING SYSTEM
Filed Sept. 13, 1950
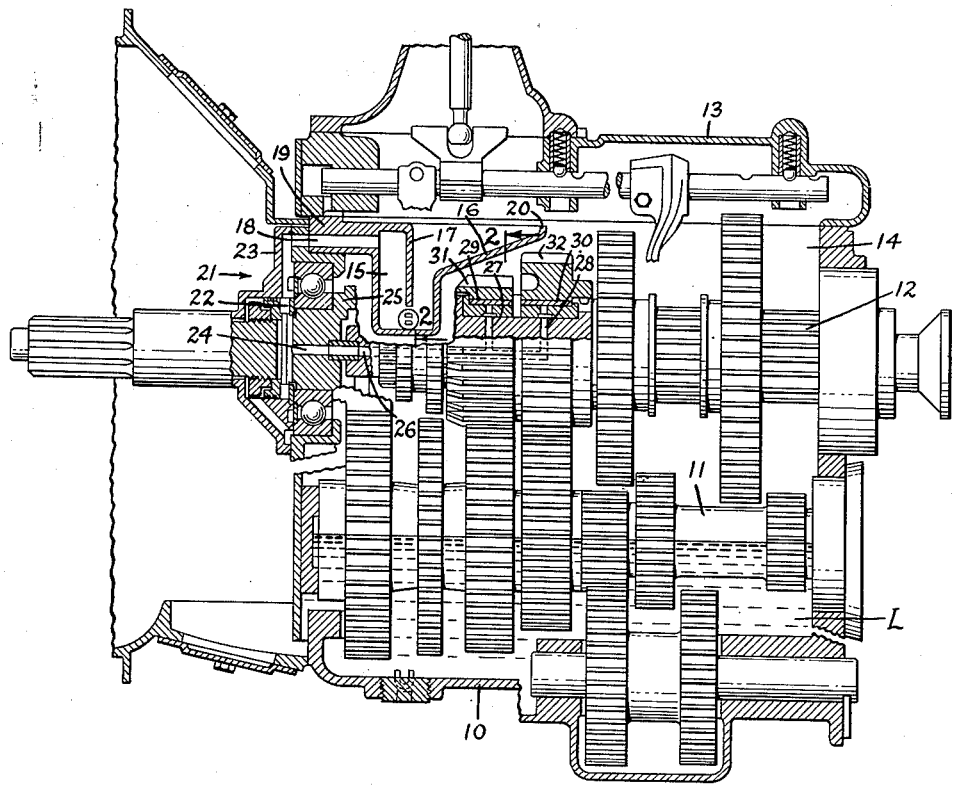
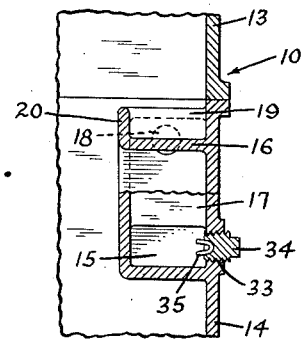
INVENTOR.
DELBERT ELWOOD WILLIS
BY
Campbell, Brumbaugh, Free & Graves
HIS ATTORNEYS.

Patented May 4, 1954

2,677,440

UNITED STATES PATENT OFFICE 2,677,440

LUBRICATING SYSTEM

Delbert Elwood Willis, New Brunswick, N. J., assignor to Mack Manufacturing Corporation, New York, N. Y., a corporation of Delaware Application September 13, 1950, Serial No. 184,591

3 Claims. (Cl. 184—6)

This invention relates to lubricating systems for machinery and it relates more particularly to devices for cleaning the oil or lubricants used in splash type lubricating systems for automotive drive units and the like.

Various provisions have been made for catching the lubricant splashed, carried or thrown by rotating or reciprocating parts of machinery and directing the lubricant to other moving parts located above the normal level of the lubricant in the unit. The means for accomplishing this result may include scrapers, collectors, shelves, conduits and the like and have been reasonably satisfactory for properly distributing the oil or lubricant to the moving parts. The use of these devices presupposes that the oil or lubricant is clean and does not take into account the fact that grit or dirt in the form of loose core sand, metal chips and other foreign matter may also be collected and directed to the moving parts.

Steel and iron chips from machined surfaces are often unintentionally retained in the assembled units and burrs or sharp edges may be broken off other parts to fall in the lubricant where they are circulated with the lubricant and result in damage, malfunction or premature failure of the mechanism.

In mechanisms of the type referred to above, there is little possibility that the foreign material can settle out of the lubricant because the motion of the parts sets up turbulence in the lubricant with the result that the foreign material is maintained in suspension in the lubricant during the operation of the machinery.

This difficulty has been recognized in the past and numerous attempts have been made to provide simple and effective cleaners for separating out the foreign material. Such devices as have been provided heretofore have not been completely satisfactory because the oil undergoing cleaning can splash back readily into the unit and, in their normal operation, considerable turbulence is also produced so that settling out or removal of the particles is not very complete. While fine mesh screens in such devices would be effective in removing the particles from circulation, they have the disadvantage of clogging easily and ceasing to function entirely if neglected. In many instances, such devices are not provided because of attendant maintenance difficulties or due to the probability of neglect.

An object of the present invention is to provide an oil cleaner for splash type lubricating systems that is not subject to clogging and by means of which an effective separation of foreign material from the oil is obtained without requiring frequent servicing.

A further object of the invention is to provide a lubricating system having an oil or lubricant cleaning device that is readily accessible for occasional servicing and which functions effectively with a minimum of parts and attention to separate foreign material from the oil and return the cleaned oil to the system or to selected bearings of the machinery.

Other objects of the invention will become apparent from the following description of a typical machine of the splash lubricated type including the oil cleaning device embodying the present invention.

In accordance with the present invention, I have provided in a splash lubricated machine, for example, an automotive transmission, a sump or pocket on the wall of the transmission housing which is provided with a generally vertically extending partition dividing the pocket or sump into a U-shaped passage of relatively large capacity. One end of the passage communicates with a collecting shelf extending inwardly in the wall of the housing which receives a part of the lubricant splashed around the housing for flow downwardly and then upwardly through the U-shaped collecting chamber. The opposite leg of the U-shaped chamber is provided with an outlet or overflow port slightly below the level of the shelf referred to above so that the oil flows downwardly into a relatively quiescent zone at the bottom of the pocket where particles are separated out by gravity and then upwardly, under a small hydrostatic head, to be discharged back into the housing or to a sump which supplies the oil to selected bearings of the machine. Inasmuch as the oil flow delivered by the pump is slow, the oil passing through the sump or pocket has very little turbulence and therefore metallic particles, grit, sand and the like can settle out at the bottom of the sump. The collected foreign material can be removed through an opening in the side of the casing or housing which is provided with a removable closure to afford access to the sump. If desired, the closure may be provided with a magnetic means for collecting iron or steel particles to facilitate their separation from the oil and removal from the sump or pocket.

For a better understanding of the present invention, reference may be had to the accompanying drawing, in which:

Fig. 1 is a view in vertical section through an automotive transmission, a part of the gear train being broken away and shown in section to disclose the oil cleaning device, also shown in section; and Fig. 2 is a view in section taken through the oil cleaning device on lines 2—2 of Fig. 1.

The invention will be described with reference to an automotive transmission of conventional type which is lubricated primarily by splashing of the oil by the rotating parts of the transmission. The invention is equally useful with other types of transmissions than that disclosed or with other machines which use splash lubrication.

Referring now to Fig. 1, the transmission may include a transmission housing 10 which houses the usual gears and shafts. The countershaft assembly 11 rotates with a portion of its mass extending below the normal level of the lubricant L in the housing 10. When in operation, rotation of the countershaft throws the lubricant up onto the spline shaft 12 and into the transmission cover 13 from where it flows down the walls of the housing back into the bottom of the housing.

In accordance with the present invention, the wall 14 of the transmission housing is provided with a sump 15 which, as shown in Figs. 1 and 2, is of generally rectangular shape in vertical and horizontal cross-section and has a lateral extension 16 or shelf at one edge inclined along the wall 14 to serve as a collector for oil splashed around the housing and running down the wall 14. As shown in Fig. 2, the extension or shelf 16, as well as the pocket or sump 15, may be cast integral with the lower part of the housing 10. Also forming a part of the oil cleaning system is a downwardly extending partition 17 which terminates short of the bottom of the sump, thereby dividing the latter into a generally U-shaped passage communicating at one end with the area defined by the shelf 16 and at its opposite end with a passage 18 in an extension 19 from the wall 14 of the housing 10. The passage 18 is slightly below the level of the lip or flange 20 which extends around the inner edge of the shelf 16 so that the oil can flow by gravity from the shelf through the passage 18.

The passage 18 communicates at its left-hand end with a pump 21 of a type disclosed in the Koster United States Patent No. 2,274,836. This pump is of a low capacity type including impeller vanes 22 which direct the oil from the interior of the pump casing 23 into an axial passage 24 in the drive pinion 25. The passage 24 also communicates with a passage 26 in the spline shaft 12 and supplies oil through radial bores 27 and 28 to the bushings 29 and 30 on which the gears 31 and 32 are rotatably mounted. Inasmuch as the clearances between the gears 31 and 32 and the bushings 29 and 30 are very small, the rate of flow of oil is low so that the oil flows slowly through the sump 15 without turbulence, thereby permitting solid materials of greater specific gravity than the oil to settle out of the oil. To permit removal of sediment from the bottom of the sump 15, a port or opening 33 is provided in the wall 14 of the housing near the bottom of the sump. This opening is closed by means of a threaded plug 34 which, if desired, may be provided with a magnet 35 for collecting ferromagnetic particles. If desired, other means, such as a cover plate or the like, may be used instead of a plug.

While the invention has been described with reference to the use of the pump 21 for returning the oil to bearings of the transmission and from the bearings into the housing, it will be understood that the oil may be discharged from the passage 18 directly into the housing 10 without passing through a pump or bearings of the transmission. With such an arrangement, the bottom of the port or overflow outlet 18 should be only slightly below the top of the shelf 16 so that the flow rate will be slow, thereby enabling the sediment to settle out of the oil.

Inasmuch as the sediment is collected within an enclosed settling chamber, there is little danger of the oil and sediment being splashed out of the passage by vibration of the transmission or vehicle and likewise turbulence is kept to a minimum. For that reason, very effective separation of solid particles and especially grit, metal chips and the like are substantially completely removed by the oil cleaner. Furthermore, removal of the sediment from the cleaner can readily be accomplished without removal of the entire lubricant supply.

It will be understood that the oil cleaning system is susceptible to considerable modification in its size and in its location, and therefore, the form of the invention described herein should be considered as illustrative and not as limiting the scope of the following claims.

I claim:

1. A lubricating system for automotive transmissions comprising a transmission housing having a lubricant reservoir in the lower portion thereof, a container for receiving lubricant formed on the side of and projecting into said housing above the normal level of the lubricant in said reservoir, a substantially vertical partition extending across said container at about its middle and nearly to the bottom of the container to form therein a U-shaped passageway, a collector shelf on the inside of said side of said housing, said shelf being inclined towards and communicating with one end of said U-shaped passageway, an outlet port communicating with the opposite end of said U-shaped passageway and being disposed on a level below said collector shelf, a clean-out aperture in the side of said transmission housing and communicating with the bottom of said container, and means detachably connected to said housing for closing said aperture.

2. A lubricating system as described in claim 1 including a magnet on said detachable means and extending into said container to collect metallic particles at the bottom of said container.

3. A lubricating system for automotive transmissions having a transmission housing with a lubricant reservoir in the lower portion thereof, and rotatable gears supported in said housing with the lower portions of at least one of the gears extending below the normal level of the lubricant in the reservoir; the combination of a sump on a side of and projecting into said housing above the normal level of the lubricant in said reservoir, said sump being substantially U-shaped and having a pair of substantially vertical passages connected at their lower ends by a transverse passage, a collector shelf on and projecting inwardly from the side of said housing and inclined towards and communicating with the upper end of one vertical passage of said U-shaped sump, an outlet port to return lubricant to said housing communicating with the upper end of the other vertical passage of said U-shaped sump and disposed on a lower level than said collector shelf, an aperture in the side of said housing and communicating with the transverse passage of said U-shaped sump, means detachably connected to said housing for closing said aperture, and a magnetic element mounted on said detachable means and extending within said transverse passage of said U-shaped sump to collect metallic particles carried by the lubricant.

References Cited in the file of this patent

UNITED STATES PATENTS

| Number | Name | Date |
| --- | --- | --- |
| 1,281,842 | Rosnick | Oct. 15, 1918 |
| 1,335,955 | Cox | Apr. 6, 1920 |
| 1,736,705 | Grandjean | Nov. 19, 1929 |
| 2,555,003 | Rhoads | May 29, 1951 |